United States Patent [19]

O'Kelly

[11] Patent Number: 5,652,787
[45] Date of Patent: Jul. 29, 1997

[54] MANAGEMENT SYSTEM FOR PUBLIC AND PRIVATE SWITCHED NETWORKS

[75] Inventor: Cathal P. O'Kelly, Maidenhead, United Kingdom

[73] Assignee: Northern Telecom Limited, Montreal, Canada

[21] Appl. No.: 539,630

[22] Filed: Oct. 5, 1995

Related U.S. Application Data

[63] Continuation of Ser. No. 228,160, Apr. 15, 1994.

[30] Foreign Application Priority Data

Apr. 17, 1993 [GB] United Kingdom .................. 9307954

[51] Int. Cl.$^6$ .......................... H04M 3/08; H04M 15/00; H04M 3/42; H04M 7/00
[52] U.S. Cl. .................. 379/112; 379/10; 379/14; 379/15; 379/115; 379/121; 379/207; 379/220; 379/225; 379/231
[58] Field of Search ......................... 379/111, 112, 379/113, 114, 115, 121, 122, 207, 220, 225, 231, 234, 1, 2, 10, 14, 15.34

[56] References Cited

U.S. PATENT DOCUMENTS

| | | | |
|---|---|---|---|
| 4,594,477 | 6/1986 | Noirot | 379/225 |
| 4,661,974 | 4/1987 | Bales | 379/225 |
| 4,935,956 | 6/1990 | Hellwarth | 379/112 |
| 5,003,584 | 3/1991 | Benyacar | 379/121 |
| 5,048,079 | 9/1991 | Harrington | 379/112 |
| 5,164,983 | 11/1992 | Brown | 379/112 |
| 5,187,710 | 2/1993 | Chau | 379/114 |
| 5,247,571 | 9/1993 | Kay | 379/207 |
| 5,297,189 | 3/1994 | Chabernaud | 379/114 |
| 5,333,183 | 7/1994 | Herbert | 379/112 |
| 5,339,356 | 8/1994 | Ishii . | |

*Primary Examiner*—Curtis Kuntz
*Assistant Examiner*—Vijay Shankar
*Attorney, Agent, or Firm*—Lee, Mann, Smith, McWilliams, Sweeney & Ohlson

[57] ABSTRACT

A hybrid network includes a public switched network and a private switched network. Each has a respective network management system. Between these systems are two interfaces, a service management interface and a network management interface. Information can be shared between the two systems in order to provide common management of the public and private networks and the services provided. A hybrid network management system within the private network management system can thus form a single view of, for example, the network faults and performance analysis of the public and private networks, which together form the overall network of a corporate customer.

6 Claims, 1 Drawing Sheet

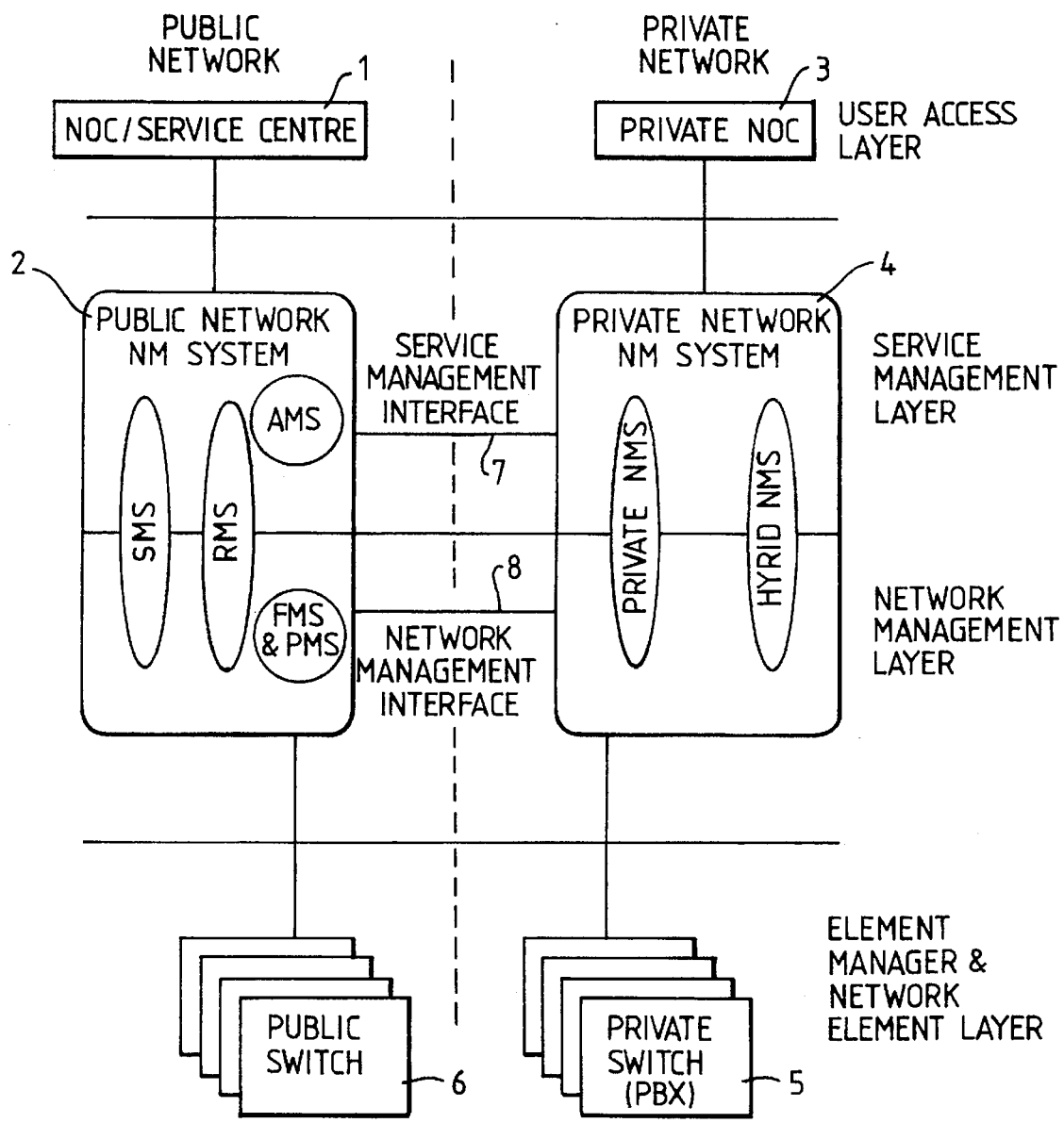

MANAGEMENT SYSTEM FOR PUBLIC AND PRIVATE SWITCHED NETWORKS

This application is a continuation of application Ser. No. 08/228,160, filed Apr. 15, 1994.

This invention relates to network management and in particular to the integrated management of public and private switched networks and services, that is to hybrid network management.

BACKGROUND OF THE INVENTION

A specific hybrid network to be discussed hereinafter is made up of private, customer owned equipment, and public carrier owned equipment and services. Historically, public network services and private network services have been managed independently without any common synergistic service and network management benefit. However this situation is changing due to advances in customer and telco (telephone company) management equipment, carrier services and the demand by customers to manage their private and public network based services in a common manner to increase service management efficiency and cost savings.

SUMMARY OF THE INVENTION

According to the present invention there is provided a hybrid network including a public switched network and a private switched network, each having a respective network management system, and wherein between the network management systems there are two interfaces, a service management interface and a network management interface, whereby information is shared between the two network management systems in order to achieve common management of the public and private networks and services provided thereby.

BRIEF DESCRIPTION OF THE DRAWING

An embodiment of the invention will now be described with reference to the accompanying drawing which illustrates hybrid network management.

DESCRIPTION OF PREFERRED EMBODIMENT

Network management systems have numerous functions, specifically at a network management layer, these are fault management (FMS), configuration management, performance management (PMS) and security and access management. The emphasis is on managing the network's physical resources. The service management layer also includes accounting management (AMS) and service provisioning functions.

An embodiment of the invention is described hereinafter in terms of a hybrid network which offers private switch (PBX) based services in conjunction with public switched based services such as Centrex and Virtual Private Network (VPN).

For the benefit of understanding, a number of terms will now be specifically defined. A user is a person who uses the telephony features of a network. An operator is a body which provides and manages the network resources. A service provider interfaces with a user and an operator in order to provide and manage services for the user. The service provider may use service management tools provided by a third party, for example a corporate service provider will use a telephone company (telco) Centrex service management system to provide his users with Centrex services. The customer is the corporate customer who operates and provides services on his private network.

From both the point of view of a corporate customer and a telco, a hybrid network management solution will only be of interest if it is more cost effective than their individual current network management schemes. The underlying factor of importance to both customers and telcos is that cost savings can be made in Operations, Administration and Maintenance (OA&M) of a hybrid network.

The physical architecture illustrated in the drawing is for hybrid network management based on the current OA&M systems (private and public network management), which are each finely tuned to meet the different network and service management needs of public and private networks. It should be noted that integration of private and public network management systems into one system would be complex and would compromise OA&M functionality. In a hybrid network as discussed hereinafter there are two non-integrated network management (NM) systems (NMS), which are used for PBX or private network services and public switched services, respectively. The NMSs exchange and share information across well defined interfaces in order to provide an integrated view of the hybrid network from both a service management and a network management perspective.

As will be appreciated from the drawing the two NMSs (public and private) are substantially separate but there are two interfaces therebetween. The drawing also shows the functionality split of the various systems. The functions are split into user (operator or service provider) access (User Access Layer), service management (Service Management Layer), network management (Network Management Layer), and element manager and network element (Element Management and Network Element Layer). User access allows the service provider or operator access to the Operations, Administration and Maintenance functions. The Service Management Layer incorporates systems which are responsible for the administration and management of services. The Network Management Layer incorporates systems responsible for management of network resources. When an OA&M system includes functionality of two different layers it is shown spanning those layers. The network element is responsible for providing network service. The element manager provides management capabilities for the network element as well as interfacing to the OA&M system.

The architecture comprises a public network management system (NMS) including Network Operations Centre (NOC) (Operator) and Service Centre (Service Provider) user access 1. The public network NMS 2 consists of a number of subsystems which include a Service Management System (SMS), Fault Management System (FMS), Resource Management System (RMS), Performance Management System (PMS) and Accounting Management System (AMS).

The private network management system includes a NMS user access 3 and the private network network management system 4 which includes functionality at the service management and network management layers. The private switch (PBX) 5 provides both network element and element management functions, as does the public switch 6 for the public network. The NMS 4 includes a private NMS and a hybrid NMS.

The two interfaces 7 and 8 between the public and private OA&M systems (NMSs 2 and 4) are for service management and network management respectively. These interfaces may be OSI (Open Standards Interconnection) interfaces or Application Programme Interfaces (API). These interfaces allow sharing of information in order to provide some hybrid NM specific functions which integrate views of the services or of the network resources.

The hybrid NM specific functions are supported by additional applications on the existing NMSs.

Examples of hybrid NM functions are detailed below for network surveillance, subscriber service provisioning and billing.

The objective of hybrid network surveillance is to provide the private network operator with a single uniform logical view of a corporate customer's hybrid network for the purpose of fault and performance monitoring of his network. Currently, the corporate customer's Virtual Backbone Network (VBN) is managed by the telco separately from the private network which is managed by the customer. There is no correlation of faults between public and private networks. There is no consolidated view of the performance of the corporate customer's entire network, both public and private. It is difficult to pinpoint the source of network performance trouble spots when there is no sharing of information between public and private NMSs.

The network management interface 8 allows the Resource Management System (RMS) to provide the hybrid NM application (Hybrid NMS) with a view (network information model) of the VBN which is integrated with the private NMSs' view (network information model), to give a single view of the entire corporate customer's network. Fault reports from the Fault Management System (FMS) and performance reports from the Performance Management System (PMS) are passed to the Hybrid NMS across the network management interface 8. These reports together with private NMS fault and performance reports allow correlation of network faults and performance analysis which may lead to corrective action and network planning to improve network efficiency.

The objective of hybrid network service provisioning is to provide the corporate service provider with the ability to manage the services of his telephony users independently of who owns the network resources supporting the services. For instance, if a user requests services at a particular site, the service provider provisions the service without requiring to know whether the service is provided by the public or private network.

The Service Management System (SMS) allows the hybrid NM application (Hybrid NMS) to manage public services via the service management interface. The hybrid NM application also uses the service management capabilities of the private NMS so that the hybrid NM application provides a single view of the services available to the corporate users.

The objective of the hybrid network accounting management is to provide the corporate customer with a single bill for usage of public and private network based services. This is required when the entire private network and respective NMS is outsourced to the telco. The telco will want to consolidate the corporate customer's entire bill. Billing data and call detail record information is passed across the service management interface 7 to the Accounting Management System (AMS). The AMS has 8 hybrid network billing and accounting management application for consolidation of public and private network billing.

The sharing of information between the two network management systems enables common management of the private and public networks and the services provided thereby to be achieved. Such common management by the value-added hybrid NMS allows efficiencies to be achieved.

I claim:

1. A telecommunications hybrid network comprising a public switched network and a private switched network, said public switched network and said private switched network each having a respective network management system comprising a user access layer, a service management layer incorporating systems responsible for administration and management of services, a network management layer incorporating network resource management means, and an element manager and network element layer, a service management interface provided between the respective service management layers of said public switched network and private switched network management systems, a network management interface provided between the respective management layers of said public switched network and private switched network management systems, wherein the public switched network incorporates fault and performance management systems and a resource management system, wherein information is shared between the two network management systems across the service management interface and across the network management interface in order to achieve common management of the public and private networks and to achieve common management of services for customers having some of their network based on the private switched network and some of their network based on the public switched network.

2. A hybrid network as claimed in claim 1, wherein the public network management system includes a fault management system and a performance management system, information from both of which can be passed over the network management interface to the hybrid network management system.

3. A hybrid network as claimed in claim 1, wherein the public network management system includes a service management system, information from which can be passed over the service management interface to the hybrid network management system in the private network to manage the public network services.

4. A hybrid network as claimed in claim 1, wherein the public network management system includes an accounting management system, and wherein for providing a corporate customer with a single bill for public and private network based services, billing data and call detail record information is passed over the service management interface from the private network network management system to the accounting management system.

5. A hybrid network as claimed in claim 4, wherein the accounting management system includes a hybrid network billing and accounting management application for consolidation of public and private network billing.

6. A method of managing a telecommunications hybrid network comprising a public switched network and a private switched network, said public switched network and said private switched network each having a respective network management system comprising a user access layer, a service management layer incorporating systems responsible for administration and management of services, a network management layer incorporating network resource management means, and an element manager and network element layer, a service management interface provided between the respective service management layers of said public switched network and private switched network management systems, a network management interface provided between the respective management layers of said public switched network and private switched network management systems, wherein the public switched network incorporates fault and performance management systems and a resource management system, wherein the method comprises sharing information between the two network management systems across the service management interface and across the network management interface in order to achieve common management of the public and private networks and to achieve common management of services for customers having some of their network based on the private switched network and some of their network based on the public switched network.

* * * * *